United States Patent [19]

Lockwood

[11] Patent Number: 5,449,206
[45] Date of Patent: Sep. 12, 1995

[54] BALL AND SOCKET JOINT WITH INTERNAL STOP

[75] Inventor: Mark B. Lockwood, Oregon City, Oreg.

[73] Assignee: Lockwood Products, Inc., Lake Oswego, Oreg.

[21] Appl. No.: 177,197

[22] Filed: Jan. 4, 1994

[51] Int. Cl.⁶ .............................................. F16L 27/04
[52] U.S. Cl. ...................... 285/261; 285/264; 285/166; 138/120
[58] Field of Search ............... 285/261, 264, 166, 184; 138/120

[56] References Cited

U.S. PATENT DOCUMENTS

| | | |
|---|---|---|
| 926,929 | 7/1909 | Dusseau . |
| 1,001,842 | 8/1911 | Greenfield ........................... 138/120 |
| 1,003,037 | 9/1911 | Crowe . |
| 1,255,577 | 2/1918 | Berry ................................... 138/120 |
| 1,260,181 | 3/1918 | Garnero . |
| 1,695,263 | 12/1928 | Jacques ............................... 285/166 |
| 1,736,160 | 11/1929 | Jonsson ............................... 285/264 |
| 2,117,152 | 5/1938 | Crosti ................................. 285/166 |
| 2,676,806 | 4/1954 | Bachman . |
| 3,034,809 | 8/1960 | Greenberg . |
| 3,196,463 | 7/1965 | Farneth . |
| 3,329,967 | 7/1967 | Martinez et al. .................... 138/120 |
| 3,389,925 | 6/1968 | Gottschald . |
| 3,754,779 | 8/1973 | Pertess ............................... 285/166 |
| 4,571,003 | 2/1986 | Roling et al. . |
| 4,739,801 | 4/1988 | Kimura et al. ...................... 285/166 |
| 4,856,822 | 8/1989 | Parker ................................ 285/166 |
| 5,153,976 | 10/1992 | Benchaar et al. . |
| 5,254,809 | 10/1993 | Martin ............................... 138/120 |

FOREIGN PATENT DOCUMENTS

| | | | |
|---|---|---|---|
| 659510 | 3/1963 | Canada ............................... 285/264 |
| 538538 | 6/1922 | France ............................... 285/264 |
| 327400 | 7/1936 | Italy .................................. 285/264 |
| 3314 | of 1914 | United Kingdom ................. 285/264 |

*Primary Examiner*—Eric K. Nicholson
*Attorney, Agent, or Firm*—Klarquist Sparkman Campbell Leith & Whinston

[57] ABSTRACT

A first connector includes opposite ball and socket elements having a passageway formed therethrough. The socket element has a cavity formed therein for receiving a ball element of a second hose connector to form a hose assembly. A ring is disposed within the cavity for limiting pivotal movement of a ball element inserted therein to minimize the risk that the connectors, and thereby the hose assembly, will separate.

17 Claims, 4 Drawing Sheets

BALL AND SOCKET JOINT WITH INTERNAL STOP

TECHNICAL FIELD OF THE INVENTION

The present invention relates to connectors which interconnect into a flexible assembly, such as into a hose, and more particularly to connectors with a stop or limiter for limiting relative pivoting movement of the connectors.

BACKGROUND OF THE INVENTION

Many ball and socket connectors have been developed in the past. A disadvantage of conventional connector designs is that it is possible for the ball to be pivoted in the socket to such an extent that the ball connector separates from the socket connector, resulting in a breaking apart of the assembly.

A device for limiting pivotal movement between a ball and a socket is disclosed in U.S. Pat. No. 2,676,806 ('806 patent) to Bachman. The '806 patent discloses a phonograph reproducer arm having a ball fitted within a socket. The ball defines a slot and the socket has a pin attached to its spherical inner surface. Pivotal movement of the ball is limited by placing the ball into the socket so that the pin is captured within the slot defined in the ball. However, the slot does not allow for much pivotal movement and the pin may break. This device also does not suggest interconnection of plural connectors into an assembly.

Similarly, U.S. Pat. No. 3,034,809 to Greenberg discloses a ball and socket joint. The ball has a slot formed therein to receive a stop pin projecting within the socket. The stop pin may break resulting in virtually unlimited pivotal movement of the ball relative to the socket. Like Bachman, this reference also does not suggest the interconnection of plural connectors, each with ball and socket elements.

Snap together connectors with ball and socket portions are also known which are interconnected to form a conduit, some of such connectors being sold by Lockwood Products, Inc. However, these connectors can separate from one another if adjacent connectors are pivoted relative to one another to an extreme extent.

SUMMARY OF THE INVENTION

The present invention is directed toward connectors which, when interconnected, form a flexible assembly. Each connector includes a body with first and second end portions. An external socket engaging surface, such as a partially spherical or ball surface, is provided at one end portion of the body. The other end portion of the body has an internal socket defining cavity bounded by an interior wall. The socket engaging surface of one connector is inserted or snapped into the socket defining cavity of another connector to interconnect the connectors. The connectors preferably have a longitudinal axis extending in the direction from the first to the second ends. A motion limiter or stop is provided to restrict the relative pivoting of adjacent connectors into extreme conditions of axial misalignment. This restriction on relative pivoting motion minimizes possible decoupling of the connectors that could otherwise result from pivoting to extreme misaligned positions. The stop may take the form of a flange or projection extending axially into the socket cavity with the socket engaging surface having a recess or opening for receiving the flange. The flange in this case engages the boundary of the recess, or another portion of the received connector, as the connectors are pivoted to the maximum extent to thereby limit further relative pivoting motion of the connectors.

The flange most preferably is in the form of an annular ring. In addition, the connector is preferably hollow to define a passageway through the connector from the first to second ends. Therefore, when interconnected, the connectors form a continuous hose or conduit for carrying fluid, wire or other items. The passageway also preferably passes through the annular ring.

It is accordingly one object of the invention to provide an improved connector which resists decoupling when interconnected into a flexible assembly of connectors.

The present invention relates to these and other objects, features and advantages, individually, as well as collectively.

DETAILED DESCRIPTION OF PREFERRED EMBODIMENT

Figure 1:
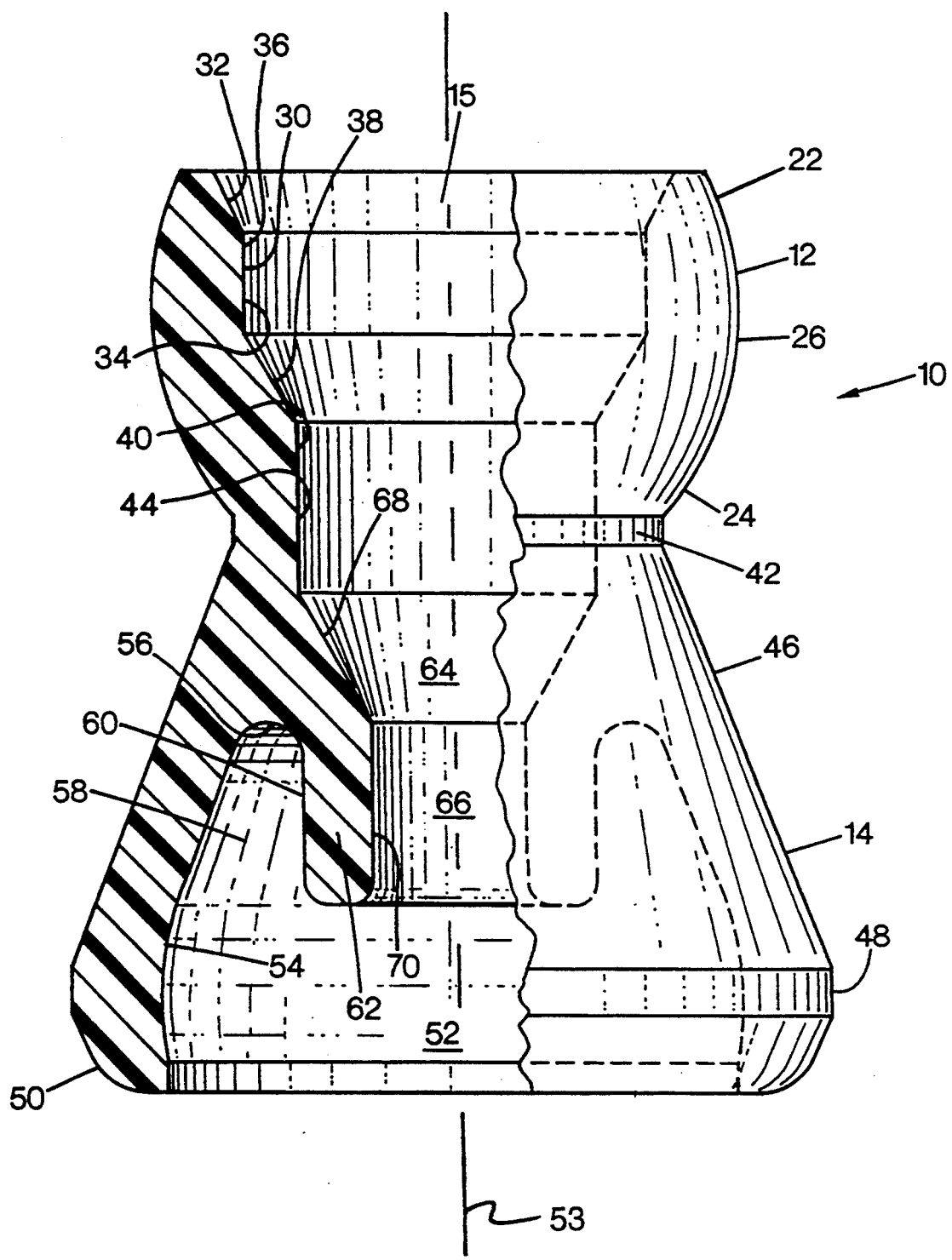
FIG. 1 shows a side view, partially in section, of one form of a preferred embodiment of the connector of the present invention.

Referring to the FIGS. 1–5, a preferred embodiment of the connector 10 of the present invention includes a body with first and second end portions. A first end portion includes a socket engaging surface such as ball element or surface 12. The second end portion 14 or socket element includes an internal socket defining cavity. The opposite ball and socket elements 12, 14 preferably have a passageway 15 formed therethrough and extending along the longitudinal axis of the connector. The passageway or conduit is used for conveying fluid or for guiding or shielding elements, such as electrical wiring, optical cable, catheters, etc. The socket element 14 is adapted to receive a socket engaging surface such as a ball element 16 of another connector such as connector 18 (see FIG. 2). Thus, the hose connector 10 and hose connector 18, as well as additional similar connectors, may be interconnected to form a flexible hose assembly 20. A plurality of connectors may be assembled in this manner to form a flexible hose assembly of a desired length.

Referring to FIG. 1, the hose connector 10 is preferably formed in one piece and is most preferably, but not necessarily, made of a durable material such as a plastic material. For example, the hose connector may be molded of an electrically non-conductive plastic material making it ideal for use as an EDM flushing hose. A premium grade acetal copolymer material has been found particularly suitable for some applications due to good chemical resistance to petroleum products, coolants and other common chemicals. Acid resistant polyester is also a suitable material. Although less desirable, the hose connector may be formed of multiple piece construction and may be made of other materials such as metal, ceramic, wood and composite materials.

Externally, the ball element 12 preferably has an outer or head portion 22 and a inner or waist portion 24 connected by a smooth curved or convex external surface 26. The ball element 12 may have other shapes that are conveniently inserted into socket elements. The diameter of ball element 12 may range from less than 1/16 inch to over several inches. The ball element 12 may be provided in standard sizes such as ¼, ½ and ¾ inch. Other sizes may also be provided.

The internal dimension of the passageway 15 at the ball element 12 is defined by an annular inner wall 30. The inner wall 30 includes an optional outwardly chamfered segment or surface 32. For example, although less preferred, the wall 30 may simply be straight instead of utilizing the chamfered surface 32. An intermediate segment 34 of wall 30 is adjacent to wall segment 32 and includes a straight portion 36 and a narrowing portion 38 leading to an inner segment 40 which includes a straight annular wall section 44. Therefore, the passageway 15 is gradually reduced in cross sectional dimension moving from the chamfered segment 32 to the inner segment 40.

Externally, the body has a circumferential neck or mid-portion 42 disposed between the waist portion 24 of the ball element 12 and the socket element 14. The socket element 14 may have a generally frustoconical exterior configuration. That is, socket element 14 has a tapered outer surface 46 that expands from the relatively narrow mid portion 42 to a large diameter section 48 and terminates at an inwardly chamfered outer portion 50. The socket element 14 may have other external configurations without departing from the invention, such as semispherical.

Again, the socket element 14 defines an internal socket cavity 52 which, if a passageway is provided, is in fluid communication with the passageway 15. The cavity is defined by an annular smooth concave inner wall surface 54 extending from the outer portion 50 to a curved base surface 56. A ball element receiving recess 58 is defined between the wall surface 54 and an outer surface 60 of a flange 62, which in the illustrated form is aligned axially with the longitudinal axis 53 of the connector 10. Flange 62 is preferably annular and may be in the shape of a right cylindrical ring.

The ring 62 projects in a direction away from the ball element 12. The internal dimension of passageway 15 is reduced at areas 64 and 66 due to the presence of the ring 62. The area 64 is defined by a tapered inner annular surface 68 of the body and the area 66 is defined by an internal annular surface 70 of the ring.

Figure 2:
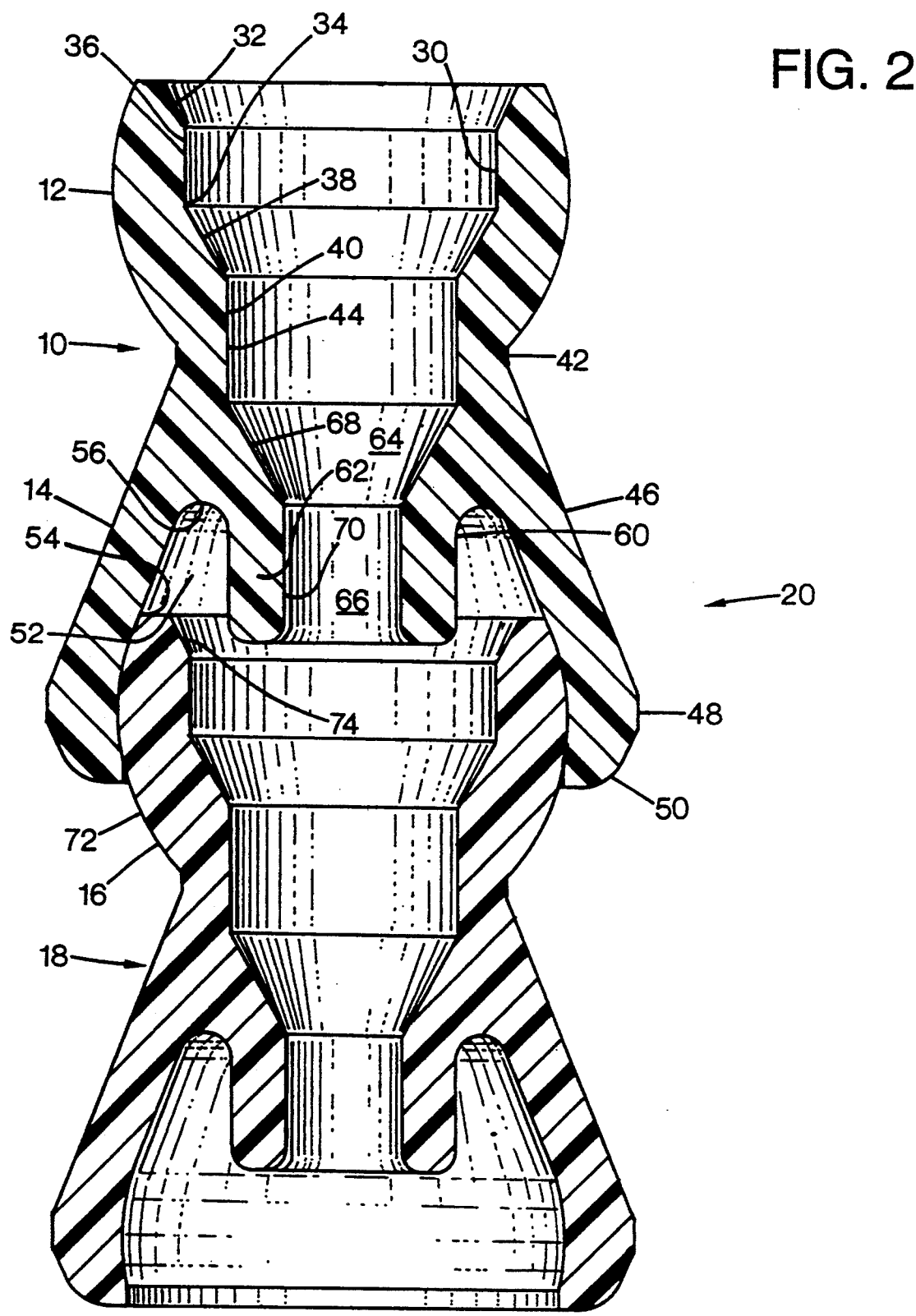
FIG. 2 shows a side sectional view of first and second connectors which are shown interconnected in an axially aligned position.

Referring to FIG. 2, the ball element 16 of hose connector 18 is adapted to snap into the socket cavity of another hose connector. For example, element 16 may be inserted into cavity 52 formed within the hose connector 10 so that the smooth external surface 72 of the ball element 16 bears against the inner wall 54 of the socket element 14. FIG. 2 illustrates only two interconnected hose connectors but, as is apparent, a large number of hose connectors may be interconnected in a similar manner to form a conduit of any desired length.

Figure 3:
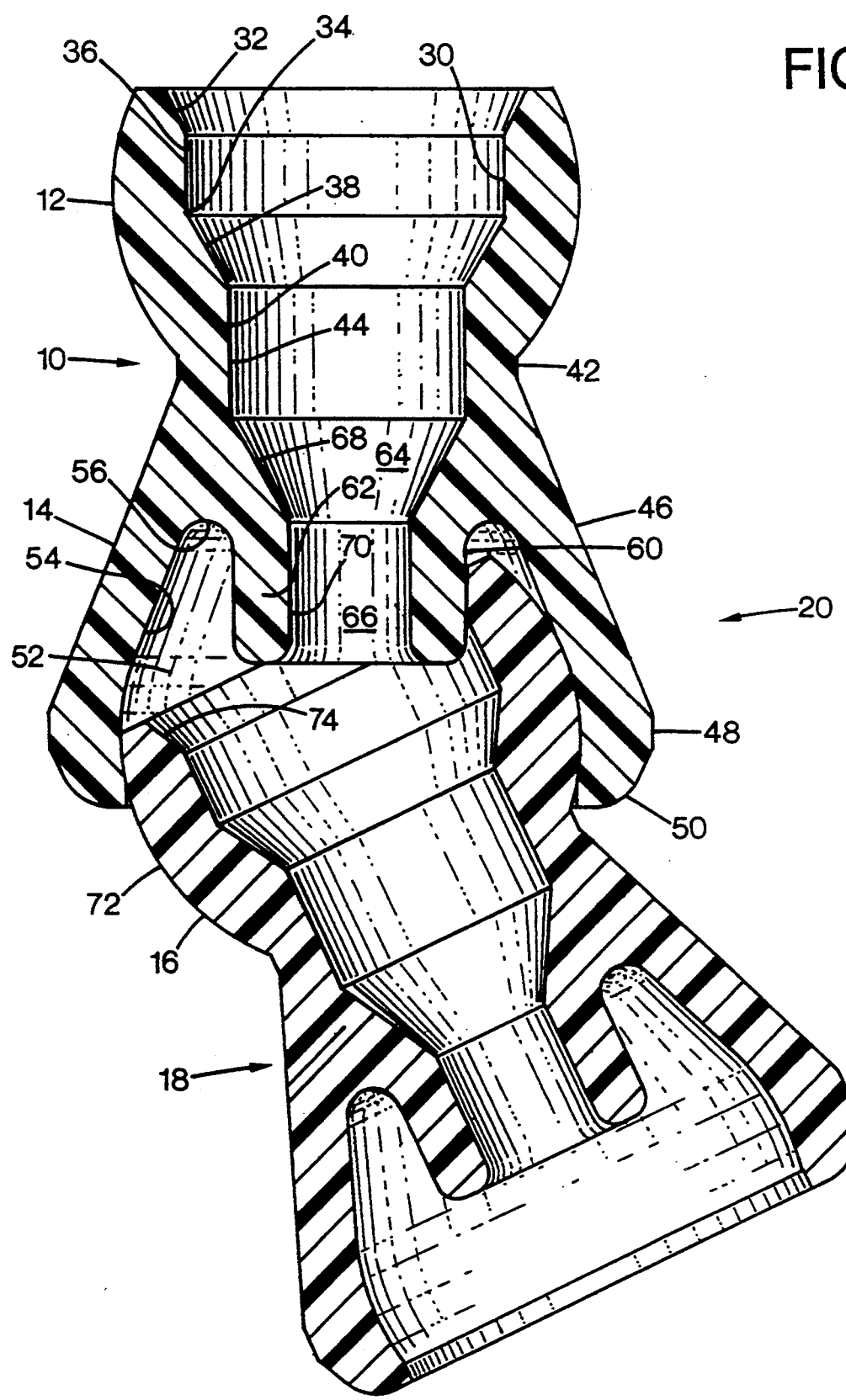
FIG. 3 shows a side sectional view of the connectors of FIG. 2 in an axially misaligned or bent position.
Figure 4:
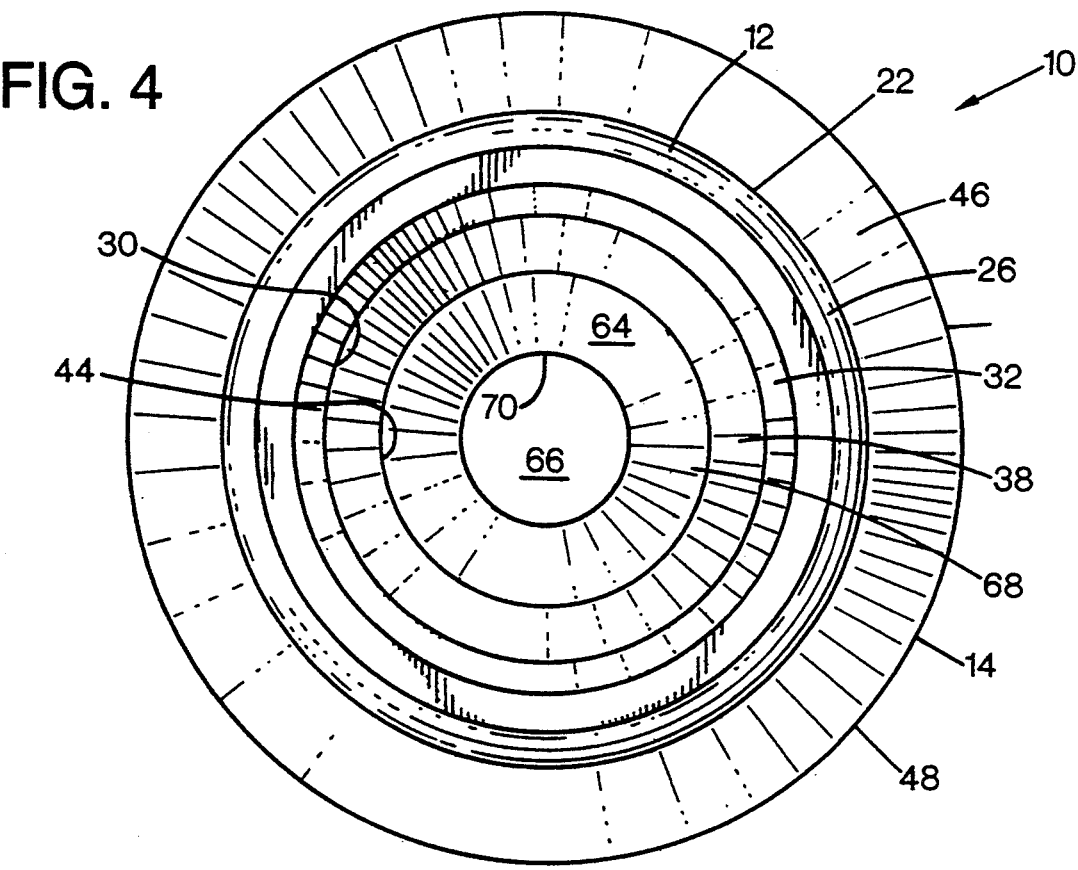
FIG. 4 shows a top view of the hose connector of FIG. 1, illustrating a passageway formed therethrough.
Figure 5:
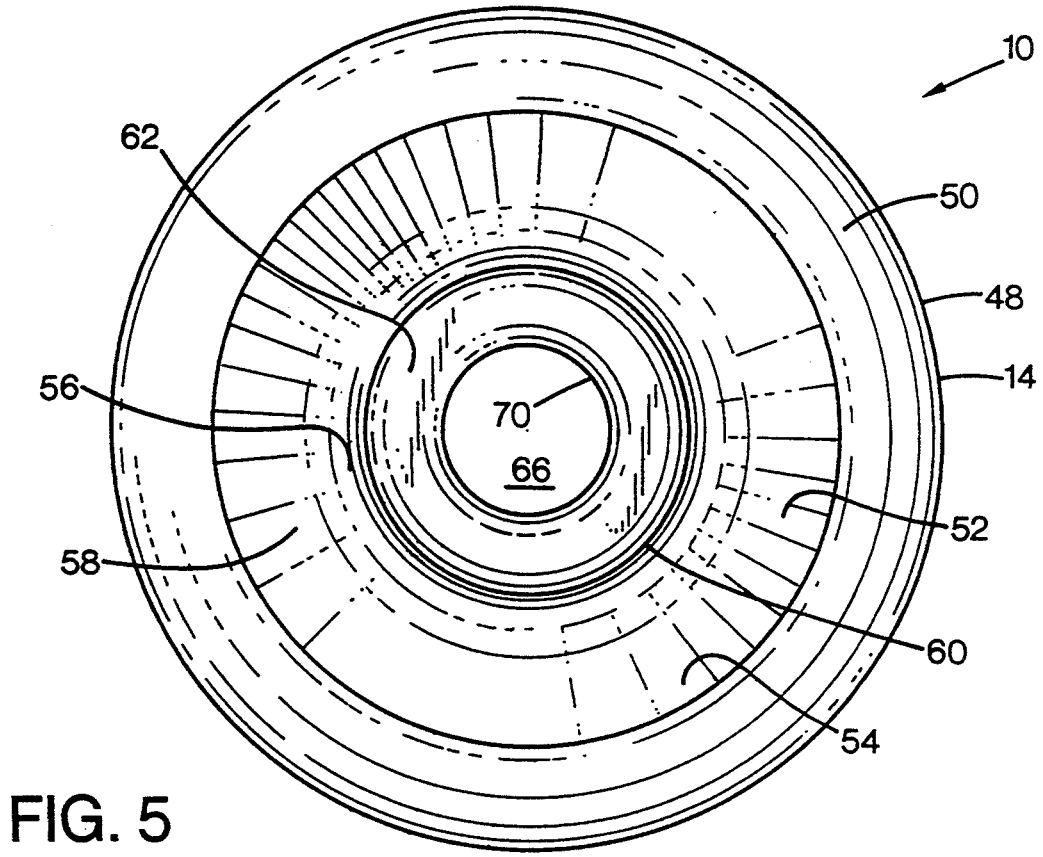
FIG. 5 shows a bottom view of the hose connector of FIG. 1, illustrating one form of a pivot motion limiter or stop.

When the hose connector 18 is interconnected to hose connector 10, the ball element 16 may pivot between an aligned position (FIG. 2) and a fully bent or axially misaligned position (FIG. 3). Relative movement of the interconnected hose connectors is limited because a chamfered inner segment or stop engaging surface 74 of the ball element 16 engages or abuts the outer surface 60 of the ring 62. Simultaneously, the curved external surface 72 of the ball element 16 bears against the inner wall surface 54 adjacent the portion 50 of the socket element 14. The inwardly curved configuration of the inner wall surface 54 assists in preventing the ball element from being disconnected or decoupled from the socket element when the chamfered inner segment 74 abuts the outer surface 60 of the ring 62. Because relative pivoting movement of the hose connectors is limited, the hose connectors are in essence locked together to provide a secure hose assembly or conduit while still permitting limited relative pivoting motion between the hose connectors. Besides assisting in maintaining the integrity of the assembled connectors, this limitation of relative pivoting movement between adjacent connectors is also desirable in many specific applications. For example, in electrical wiring applications limiting the pivoting movement of adjacent connectors prevents damage to the wiring arising from excessive bending or stretching of the electrical wiring disposed within the hose assembly.

It should be noted that the stop may take many different forms as long as it limits the relative pivoting of adjacent connectors sufficiently to resist decoupling of the connectors.

In the preferred embodiment, each ball element of a connector is dimensioned to tightly fit inside a respective socket element of another connector so that the hose connectors may remain pivoted even under a slight load. Of course, the ball elements may be designed pivot freely within the socket elements, subject to limits on motion provided by a stop.

While the present invention has been described in accordance with the preferred embodiment, it is to be understood that certain substitutions and alterations may be made thereto without departing from the spirit and scope of the claims. I claim all such modifications which fall within the scope of the following claims.

I claim:

1. A connector comprising:
   a body of a polymer material having first and second end portions and a longitudinal axis extending in the direction from the first to the second end portions, the body defining a passageway therethrough between the first and second end portions;
   the body including a socket engaging end surface at the first end portion, the first end portion defining a stop receiving opening which is open through the socket engaging end surface and which is a portion of the passageway, the socket engaging end surface being the external surface of the first end portion of the body;
   the body also including an internal socket receiving cavity or opening at the second end portion; and
   the body including a stop projecting longitudinally from the body and into the internal socket receiving cavity, whereby when the socket engaging end surface of a first of said connectors is inserted into the internal socket receiving cavity of a second of said connectors, the stop of the second connector is inserted into the stop receiving opening of the first connector to limit the relative pivoting of the connectors.

2. A connector according to claim 1 in which the passageway extends through the stop.

3. A connector according to claim 2 in which the stop comprises an annular ring.

4. A connector according to claim 3 in which the cross sectional dimension of the annular ring is smaller than the cross sectional dimension of the stop receiving cavity.

5. A connector according to claim 4, in which the passageway has a cross sectional dimension at the first end portion which is sized larger than the cross sectional dimension of the annular stop.

6. A connector according to claim 3 wherein the socket engaging end surface has a chamfered ring engaging surface.

7. A connector according to claim 1 in which the socket engaging end surface is a smooth depression free and projection free curved end surface.

8. A hose connector assembly comprising:
a first connector having a first female portion, an opposite first male portion and a first longitudinal axis;
a second connector having a second female portion, an opposite second male portion and a second longitudinal axis, the second male portion having an interior wall which defines a longitudinally extending stop receiving opening;
the second male portion being sized for insertion into the first female portion to interconnect the first and second connectors with the first connector being free to pivot about the first longitudinal axis and relative to the second connector and the second connector being free to pivot about the second longitudinal axis and relative to the first connector, an annular flange disposed within the first female portion and positioned to extend into the stop receiving opening to engage the interior wall of the second male portion to limit the extent of pivoting movement of the second longitudinal axis out of alignment with the first longitudinal axis when the second male portion is disposed within the first female portion.

9. A connector assembly according to claim 8 wherein the first and second connectors each have a passageway formed therethrough, the passageways being in communication through the annular flange.

10. A connector assembly according to claim 8 wherein the annular flange has an exterior surface and the second male portion has a chamfered surface which is positioned to abut the exterior surface of the annular flange as the second connector is pivoted relative to the first connector to thereby limit the extent to which the connectors pivot relative to each other.

11. A connector assembly according to claim 8 wherein the connectors are made of a non-electrically conductive polymer material.

12. A plurality of at least three connectors which interconnect to form an assembly of connectors, each connector comprising:
a body with first and second end portions;
the body including a single external socket engaging surface at the first end portion and a single internal socket defining cavity at the second end portion, the first end portion including a stop receiving passageway which communicates with the socket defining cavity to provide an internal passageway from the first to the second end portions, the socket defining cavity of each connector being sized to pivotally receive the socket engaging surface of another connector so as to interconnect the plurality of connectors, and each connector also including a stop projecting into the interior of the socket defining cavity, the stop of said each connector projecting into the stop receiving passageway of an adjoining connector when interconnected to limit the relative pivoting of the interconnected connectors, the internal passageways of a plurality of interconnected connectors forming a hose or conduit.

13. Connectors according to claim 12 in which respective socket engaging surfaces are sized to snap fit into the respective socket defining cavities to interconnect the plurality of connectors.

14. Connectors according to claim 12 which have a longitudinal axis extending in the direction from the first to second end portions, the stop limiting the extent to which the interconnected connectors pivot out of alignment of their respective longitudinal axes.

15. Connectors according to claim 12 wherein each stop comprises a single flange projecting into the interior of the socket defining cavity and wherein the first end portion of the body includes a flange engaging surface positioned to engage the flange as the limit of relative pivoting of the interconnected connectors is reached.

16. Connectors according to claim 15 in which each stop comprises an annular flange.

17. Connectors according to claim 16 in which each stop is in the form of a right cylindrical ring.

* * * * *